(12) United States Patent
Schneider et al.

(10) Patent No.: US 11,563,234 B2
(45) Date of Patent: Jan. 24, 2023

(54) MIXED COMPOSITE SOLID STATE ELECTROLYTE FOR ELECTROCHEMICAL CELLS

(71) Applicants: Robert Bosch GmbH, Stuttgart (DE); Daniel Schneider, Orion, MI (US); David Naughton, Oxford, MI (US)

(72) Inventors: Daniel Schneider, Orion, MI (US); David Naughton, Oxford, MI (US)

(73) Assignee: Robert Bosch GmbH, Stuttgart (DE)

( * ) Notice: Subject to any disclaimer, the term of this patent is extended or adjusted under 35 U.S.C. 154(b) by 187 days.

(21) Appl. No.: 16/640,191

(22) PCT Filed: Aug. 21, 2018

(86) PCT No.: PCT/US2018/047234
§ 371 (c)(1),
(2) Date: Feb. 19, 2020

(87) PCT Pub. No.: WO2019/046041
PCT Pub. Date: Mar. 7, 2019

(65) Prior Publication Data
US 2020/0176808 A1    Jun. 4, 2020

Related U.S. Application Data

(60) Provisional application No. 62/552,703, filed on Aug. 31, 2017.

(51) Int. Cl.
*H01M 10/056* (2010.01)
*H01M 4/36* (2006.01)
(Continued)

(52) U.S. Cl.
CPC ......... *H01M 10/056* (2013.01); *H01M 4/364* (2013.01); *H01M 50/446* (2021.01);
(Continued)

(58) Field of Classification Search
CPC .. H01M 10/056; H01M 50/46; H01M 50/446; H01M 4/364
See application file for complete search history.

(56) References Cited

U.S. PATENT DOCUMENTS 8,309,257 B2   11/2012   Kanamura et al.
9,178,255 B2   11/2015   Kumar et al.
(Continued)

FOREIGN PATENT DOCUMENTS

CN        101040401        9/2007
CN        102859759        8/2016
(Continued)

OTHER PUBLICATIONS

Yoon; "Salt complex formation in atactic poly(propylene oxide): chain conformation and structure effects on ionic conduction"; Feb. 2014 (Year: 2014).*
(Continued)

*Primary Examiner* — Nathanael T Zemui
(74) *Attorney, Agent, or Firm* — Kelly McGlashen; Maginot, Moore & Beck LLP (57) ABSTRACT

An electrochemical cell includes a solid state material that functions as an electrolyte and a separator within the electrode assembly. The solid state material is a mixture of a polymer that is interspersed with an ionically conductive ceramic material.

18 Claims, 2 Drawing Sheets

(51) Int. Cl.
*H01M 50/46* (2021.01)
*H01M 50/446* (2021.01)
*H01M 4/02* (2006.01)

(52) U.S. Cl.
CPC ...... *H01M 50/46* (2021.01); *H01M 2004/027* (2013.01); *H01M 2004/028* (2013.01); *H01M 2300/0068* (2013.01); *H01M 2300/0082* (2013.01)

(56) References Cited

U.S. PATENT DOCUMENTS

| | | | |
|---|---|---|---|
| 9,985,313 | B2 | 5/2018 | Strand et al. |
| 2008/0268346 | A1 | 10/2008 | Inda |
| 2009/0136830 | A1 | 5/2009 | Gordon |
| 2015/0079485 | A1 | 2/2015 | Choi et al. |
| 2015/0188187 | A1 | 7/2015 | Strand et al. |
| 2016/0351973 | A1 | 12/2016 | Albano et al. |
| 2017/0187063 | A1 | 6/2017 | Pistorino et al. |
| 2017/0222262 | A1 | 8/2017 | Kim et al. |
| 2017/0250446 | A1* | 8/2017 | Kim ............... H01M 10/056 |
| 2017/0346135 | A1 | 11/2017 | Choi et al. |
| 2018/0254523 | A1* | 9/2018 | Ahn ............... H01M 10/0565 |
| 2018/0277909 | A1* | 9/2018 | Harada ........... H01M 10/052 |
| 2020/0321653 | A1* | 10/2020 | O'Neill ........... H01M 10/0525 |

FOREIGN PATENT DOCUMENTS

| | | |
|---|---|---|
| CN | 105655635 | 8/2016 |
| CN | 104064707 | 2/2017 |
| DE | 102015111806 | 1/2017 |
| JP | H03129603 | 6/1991 |
| JP | 2934450 | 8/1999 |
| JP | 2005310795 | 11/2005 |
| JP | 2019505961 | 2/2019 |
| KR | 1020160037061 | 4/2016 |

OTHER PUBLICATIONS

U.S. Statutory Invention Registration H1576, Aug. 6, 1996, Walker Jr. et al.
Zhang et al, "A ceremic/polymer composite solid electrolyte for sodium batteries", Journal of Materials Chemistry A, vol. 4, No. 41, Apr. 2016, pp. 15823-15828.
PCT International Search Report for PCT/US2018/047234.
Walker Jr. et al, "Plasticizers for Solid Polymer Electrolytes", Army Research Laboratory, Feb. 1995, pp. 1-36.
Swallow et al., "Chemomechanics of ionically conductive ceramics for electrical energy conversion and storage", J Electroceram, JECR Special Issue on Electro-Chemo-Mechanics, Jan. 16, 2014, pp. 1-25.

* cited by examiner

MIXED COMPOSITE SOLID STATE ELECTROLYTE FOR ELECTROCHEMICAL CELLS

This application is a 35 U.S.C. § 371 National Stage Application of PCT/US2018/047234 filed on Aug. 21, 2018, which claims priority to U.S. provisional patent application No. 62/552,703, filed on Aug. 31, 2017, the disclosures of which are incorporated herein by reference in their entirety.

BACKGROUND

Electrochemical cells include a negative electrode, a positive electrode and an electrolyte that provides ionic communication between the electrodes within the battery. The electrodes are usually prevented from coming into direct contact by some form of a separator, which allows the movement of ions but not of electrons. Electrochemical cells or batteries are usually equipped with current collectors which can be connected to an external electrical circuit for utilizing the electrical energy stored by the battery. In case of rechargeable electrochemical cells or batteries, the same current collectors serve in the recharging of the battery or cell.

Some cells employ a solid polymer electrolyte that also provides the functions of the separator, and the separate separator is omitted. The main advantages of this type of electrochemical cell are better inherent safety due to lack of flammable liquid electrolyte solvents and lighter weight. One drawback to including a solid polymer electrolyte/separator is that the resulting cell must be heated during operation to relatively high temperatures (at least 60° Celsius) in order to "activate" the ion transfer properties of the polymer. One of the greatest challenges to large scale implementation of a solid polymer electrolyte/separator in cells is reducing the high operating temperature requirement to something nearer to room temperature (about 25° Celsius).

An alternative to using solid polymer electrolyte/separator is the use of a ceramic electrolyte/separator. Using a ceramic electrolyte/separator in a cell is relatively new and thus lags behind use of a solid polymer electrolyte/separator. However, cells including a ceramic electrolyte/separator have shown the ability to operate much closer to room temperature than the solid polymer electrolyte/separator. There may be, however, a higher internal resistance with ceramic electrolyte/separator which can have a negative impact on the power capabilities of the resulting cells.

SUMMARY

In some aspects, a solid state electrolyte includes a mixture of an ionically conductive polymer that is interspersed with an ionically conductive ceramic material. In the mixture, the ratio of the weight of the ionically conductive ceramic material to the weight of the ionically conductive polymer is in a range of 90/10 to 40/60.

In some embodiments, the ratio of the weight of the ionically conductive ceramic material to the weight of the ionically conductive polymer is in a range of 80/20 to 75/25.

In some embodiments, the solid state electrolyte is a separator film having a film thickness, and the ionically conductive ceramic material has a median particle size that is less than or equal to 40 percent of the film thickness.

In some embodiments, the standard deviation of the median particle size is less than or equal to one percent of the median particle size.

In some embodiments, the ionically conductive ceramic material has a particle size distribution that is bi-modal. The ionically conductive ceramic material includes a first set of particles having first median particle size defining a first mode of the particle size distribution, the first median particle size being less than or equal to 40 percent of the film thickness. In addition, the ionically conductive ceramic material includes a second set of particles having second median particle size defining a second mode of the particle size distribution, the second median particle size being less than or equal to 20 percent of the film thickness. The first set of particles provides 66.6 percent by weight of a total weight of the ionically conductive ceramic material, and the second set of particles provides 33.3 percent by weight of the total weight of the ionically conductive ceramic material.

In some embodiments, the ionically conductive ceramic material has a particle size distribution that is tri-modal. The ionically conductive ceramic material includes a first set of particles having first median particle size defining a first mode of the particle size distribution, the first median particle size being less than or equal to 40 percent of the film thickness. The ionically conductive ceramic material includes a second set of particles having second median particle size defining a second mode of the particle size distribution, the second median particle size being less than or equal to 20 percent of the film thickness. In addition, the ionically conductive ceramic material includes a third set of particles having third median particle size defining a third mode of the particle size distribution, the third median particle size being less than or equal to 10 percent of the film thickness. The first set of particles provides 50 percent by weight of a total weight of the ionically conductive ceramic material, the second set of particles provides 30 percent by weight of the total weight of the ionically conductive ceramic material and the third set of particles provides 20 percent by weight of the total weight of the ionically conductive ceramic material.

In some embodiments, the ionically conductive polymer is an atactic polypropylene oxide.

In some embodiments, the mixture includes an ionically conductive coupling agent that is configured to improve the surface area contact between the ionically conductive ceramic material and the ionically conductive polymer.

In some embodiments, the ionically conductive polymer has a molecular weight that is less than or equal to 4,000,000.

In some embodiments, the ionically conductive polymer has a molecular weight that is in a range of 1,500,000 to 2,500,000.

In some embodiments, the ionically conductive ceramic material is mixed with the ionically conductive polymer in such a way that both materials are interspersed throughout the mixture.

In some aspects, a solid state electrolyte is configured to be combined with an active material to form an electrode of an electrochemical cell. The electrochemical cell includes a solid state electrolyte separator, and the separator has a separator thickness. The solid state electrolyte that forms the electrode includes a mixture of an ionically conductive polymer that is interspersed with an ionically conductive ceramic material. The mixture is configured such that a ratio of the weight of the ionically conductive ceramic material to the weight of the ionically conductive polymer is in a range of 90/10 to 40/60.

In some embodiments, the ratio of the weight of the ionically conductive ceramic material to the weight of the ionically conductive polymer is in a range of 80/20 to 75/25.

In some embodiments, the ionically conductive ceramic material has a median particle size that is less than or equal to 20 percent of the separator thickness.

In some embodiments, the standard deviation of the median particle size is less than or equal to one percent of the median particle size.

In some embodiments, the ceramic material has a particle size distribution that is bi-modal. The ceramic material includes a first set of particles having first median particle size defining a first mode of the particle size distribution, the first median particle size being less than or equal to 20 percent of the separator thickness. In addition, the ceramic material includes a second set of particles having second median particle size defining a second mode of the particle size distribution, the second median particle size being less than or equal to 10 percent of the separator thickness. The first set of particles provides 66.6 percent by weight of a total weight of the ceramic material, and the second set of particles provides 33.3 percent by weight of the total weight of the ceramic material.

In some embodiments, the ionically conductive polymer has a molecular weight that is less than or equal to 900,000.

In some embodiments, the ionically conductive polymer has a molecular weight that is in a range of 450,000 to 750,000.

In some embodiments, the mixture includes an ionically conductive coupling agent that is configured to improve the surface area contact between the ionically conductive ceramic material and the ionically conductive polymer.

In some aspects, an electrochemical cell includes a positive electrode, a negative electrode, and a solid state electrolyte that is disposed between the positive electrode and the negative electrode and electrically insulates the positive electrode from the negative electrode while allowing ions to move between the positive electrode and the negative electrode. The solid state electrolyte includes a first mixture of a first ionically conductive polymer that is interspersed with a first ionically conductive ceramic material. The first mixture is configured such that a ratio of the weight of the first ionically conductive ceramic material to the weight of the first ionically conductive polymer in a range of 90/10 to 40/60.

In some embodiments, the ratio of the weight of the first ionically conductive ceramic material to the weight of the first ionically conductive polymer is in a range of 80/20 to 75/25.

In some embodiments, the solid state electrolyte is a film having a film thickness, and the first ionically conductive ceramic material has a median particle size that is less than or equal to 40 percent of the film thickness.

In some embodiments, the standard deviation of the median particle size is less than or equal to one percent of the median particle size.

In some embodiments, the first ionically conductive ceramic material has a particle size distribution that is bi-modal. The first ionically conductive ceramic material includes a first set of particles having first median particle size defining a first mode of the particle size distribution, the first median particle size being less than or equal to 40 percent of the film thickness. In addition, the first ionically conductive ceramic material includes a second set of particles having second median particle size defining a second mode of the particle size distribution, the second median particle size being less than or equal to 20 percent of the film thickness. The first set of particles provides 66.6 percent by weight of a total weight of the first ionically conductive ceramic material, and the second set of particles provides 33.3 percent by weight of the total weight of the first ionically conductive ceramic material.

In some embodiments, the first ionically conductive ceramic material has a particle size distribution that is tri-modal. The first ionically conductive ceramic material includes a first set of particles having first median particle size defining a first mode of the particle size distribution, the first median particle size being less than or equal to 40 percent of the film thickness. The first ionically conductive ceramic material includes a second set of particles having second median particle size defining a second mode of the particle size distribution, the second median particle size being less than or equal to 20 percent of the film thickness. In addition, the first ionically conductive ceramic material includes a third set of particles having third median particle size defining a third mode of the particle size distribution, the third median particle size being less than or equal to 10 percent of the film thickness. The first set of particles provides 50 percent by weight of a total weight of the first ionically conductive ceramic material, the second set of particles provides 30 percent by weight of the total weight of the first ionically conductive ceramic material and the third set of particles provides 20 percent by weight of the total weight of the first ionically conductive ceramic material.

In some embodiments, the first ionically conductive polymer is an atactic polypropylene oxide.

In some embodiments, the first ionically conductive polymer has a molecular weight that is less than or equal to 4,000,000.

In some embodiments, the first ionically conductive polymer has a molecular weight that is in a range of 1,500,000 to 2,500,000.

In some embodiments, the first mixture includes an ionically conductive coupling agent that is configured to improve the surface area contact between the first ionically conductive ceramic material and the first ionically conductive polymer.

In some embodiments, one of the positive electrode and the negative electrode is a solid state electrode that includes an electrode active material and a second mixture. The second mixture includes a second ionically conductive polymer that is interspersed with a second ionically conductive ceramic material. The second mixture is configured such that a ratio of the weight of the second ionically conductive ceramic material to the weight of the second ionically conductive polymer in a range of 90/10 to 40/60.

In some embodiments, the first ionically conductive polymer is the same as the second ionically conductive polymer, and the first ionically conductive ceramic material is the same as the second ionically conductive ceramic material.

In some embodiments, the second ionically conductive ceramic material has a median particle size that is less than or equal to 20 percent of the film thickness.

In some embodiments, the standard deviation of the median particle size is less than or equal to one percent of the median particle size.

In some embodiments, the second ionically conductive ceramic material has a particle size distribution that is bi-modal. The second ionically conductive ceramic material includes a first set of particles having first median particle size defining a first mode of the particle size distribution, the first median particle size being less than or equal to 20 percent of the film thickness. In addition, the second ionically conductive ceramic material includes a second set of particles having second median particle size defining a second mode of the particle size distribution, the second median particle size being less than or equal to 10 percent of the film thickness. The first set of particles provides 66.6 percent by weight of a total weight of the ceramic material, and the second set of particles provides 33.3 percent by weight of the total weight of the second ionically conductive ceramic material.

In some embodiments, the e second ionically conductive polymer has a molecular weight that is less than or equal to 900,000.

In some embodiments, the second ionically conductive polymer has a molecular weight that is in a range of 450,000 to 750,000.

In some embodiments, the second mixture includes an ionically conductive coupling agent that is configured to improve the surface area contact between the second ionically conductive ceramic material and the second ionically conductive polymer.

In some aspects, a method of forming a solid state electrolyte includes the following method steps: Mixing an ionically conductive polymer and an ionically conductive ceramic material to form a mixture, wherein the mixture is configured such that a ratio of the weight of the ionically conductive ceramic material to the weight of the ionically conductive polymer is in a range of 90/10 to 40/60; Adding a sufficient amount of liquid organic solvent to the mixture to form a slurry; Casting the slurry into a plate form; and Drying the cast slurry to form a sheet that is a solid state mixed composite electrolyte sheet in which the ionically conductive polymer is interspersed with an ionically conductive ceramic material.

In some embodiments, the step of casting the slurry comprises forming a finished sheet that is less than or equal to 20 microns thick, where the term "finished" refers to a condition in which the sheet has been dried and calandared.

In some aspects, a method of forming a solid state electrolyte includes the following method steps: Mixing an ionically conductive polymer and an ionically conductive ceramic material to form a mixture, wherein the mixture is configured such that a ratio of the weight of the ionically conductive ceramic material to the weight of the ionically conductive polymer is in a range of 90/10 to 40/60; Treating the mixture to form a flowable material; Extruding the flowable material into a plate form; and Drying the cast slurry to form a sheet that is a solid state mixed composite electrolyte sheet in which the ionically conductive polymer is interspersed with an ionically conductive ceramic material.

In some embodiments, the step of treating the mixture comprises heating the material.

In some embodiments, the step of treating the mixture comprises adding a sufficient amount of liquid organic solvent to the mixture to form a flowable material.

In some embodiments, the step of extruding the flowable material comprises forming a finished sheet that is less than or equal to 20 microns thick, where the term "finished" refers to a condition in which the film has been dried and calandared.

In some embodiments, an electrochemical cell includes a solid state electrolyte that may also function as a separator, and that is a mixed composite of a polymer and an ionically conductive ceramic material. In the mixed composite, solid state electrolyte, the ceramic material is used in the polymer (for example, polyethylene oxide (PEO)) in order to reduce the temperature required to allow ion flow. In some embodiments, the ceramic materials could replace the block co-polymers currently used to give structural integrity to the polymer materials. It is contemplated that the amount of the ceramic material in the mixture could be between 40% and 90% of the total solids of the mixture, by weight.

The polymer and the ionically conductive ceramic material are combined (e.g., blended or mixed) as a mixture such that the resulting composite material has both materials interspersed throughout. This can be compared to some hybrid solid state electrolyte composites that graft a layer of a first material such as the polymer onto a layer of a second material such as an ionically conductive ceramic material, and the resulting composite is a laminate.

This disclosure relates to a mixed composite of the polymer and ceramic materials that provides a solid state electrolyte. The mixed composite polymer and ceramic solid state electrolyte is a hybrid of a solid state polymer electrolyte and a solid state ceramic electrolyte, in order to create the benefit of both materials. The ceramic materials used in the mixed composite may serve as an ion conductor at lower temperatures than a polymer, provide structure (for example, rigidity) and provide a tortuous path for dendrites. In addition, the polymeric materials used in the mixed composite may serve to provide flexibility and to bind the ceramic particles. Some theorize that that, for certain polymers, a high conductivity polymer "interphase" forms at the surface of the ceramic that enhances conductivity at relatively low temperatures. Thus, the electrolyte may have the ability to operate much closer to room temperature than a substantially pure solid polymer electrolyte/separator, and may have greater ductility than a substantially pure solid state ceramic electrolyte. Moreover, the disclosure could also be considered a method of transitioning from exclusively using one material to using the other.

DETAILED DESCRIPTION

Figure 1:
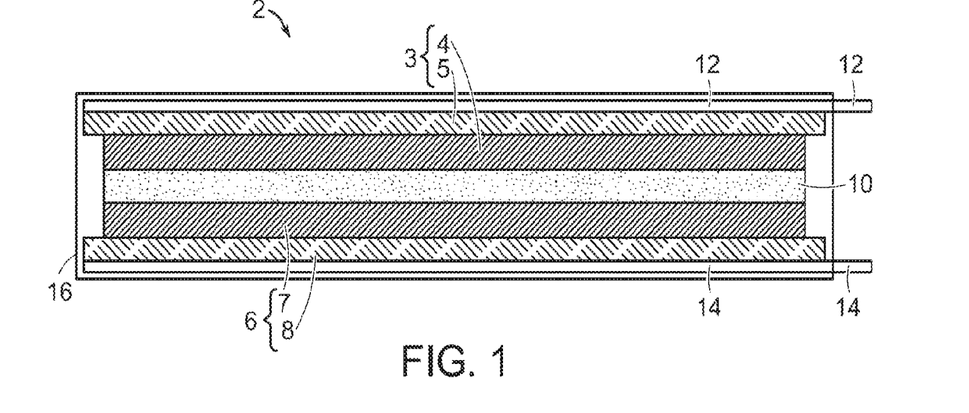
FIG. 1 is a schematic illustration of an electrode assembly of an electrochemical cell comprising a positive electrode, a negative electrode, and a mixed composite solid state electrolyte.

Referring to FIG. 1, an electrochemical cell 2 includes a cathode 3, an anode 6 and a solid state material 10 disposed between the anode and cathode that functions both as an electrolyte and a separator and provides passage for the ionic electro-active species of the electrochemical cell 2. The electrolyte 10 is a solid state electrolyte formed of a mixed polymer and ceramic composite, as discussed in detail below. The cathode 3 and the anode 6 are prevented from coming into direct contact by the solid electrolyte 10, which allows the movement of ionic electro-active species but not of electrons. In some embodiments, a separate separator (not shown) may be provided in addition to the solid state electrolyte 10, where the separator provides physical support to the solid state electrolyte. The cell 2 includes current collectors 12, 14 that extend between the respective cathode 3 and anode 6 and the exterior of the cell housing 16, and that can be connected to an external electrical circuit for utilizing the electrical energy generated by the battery. In case of rechargeable electrochemical cells or batteries, the same current collectors 12, 14 serve in the recharging of the battery or cell.

In some embodiments, the cathode 3 has a layered structure and includes an active cathode material 4 that is applied in a slurry coating process, printing process or other appropriate process to one surface of a first electrically conductive sheet 5. For example, the first electrically conductive sheet 5 may be formed of aluminium or other suitable material. The active cathode material 4 may be secured to the surface of the first electrically conductive sheet 5 using a binder (not shown). In some embodiments, the active cathode material 4 is a lithiated metal phosphate. In some embodiments the active cathode material 4 is a lithiated metal oxide.

In some embodiments, the anode 6 has a layered structure and includes an active anode material 7 that is applied in a slurry coating process, printing process or other appropriate process to one surface of a second electrically conductive sheet 8. For example, the second electrically conductive sheet 8 may be formed of copper or other suitable material. The active anode material 7 may secured to surface of the second electrically conductive sheet 9 via a binder (not shown). The active anode material 7 may be a substance capable of reversibly intercalating lithium ions. In some embodiments, the active anode material 7 is metallic lithium (i.e., lithium foil) or a lithium alloy. In some embodiments, the active anode material 7 is a graphitic material. In some embodiments, the active anode material 7 is a pure silicon. In some embodiments, the active anode material 7 is a composite of graphitic material and silicon.

The electrolyte is a solid state electrolyte that is a composite of a polymer and an ionically conductive ceramic material.

In some embodiments, the polymer is an ionically conductive polymer or ionically conductive copolymer. In some embodiments, the polymer is a polyethylene oxide. In some embodiments, the polymer is a polypropylene oxide. In some embodiments, the polymer is an alternative polyolefin oxide.

In some embodiments, the ionically conductive polymer includes poly(propylene oxide) (PPO) as an ionic conductive polymer block. For example, the PPO may be an atactic asymmetric monomer. An atactic monomer has substantially no racemo diads, triads or other higher-order substituents. The random placement of the substituents along the polymer chain yields a polymer with a low degree of crystallinity, especially at temperatures below 80° C., thereby preserving good ionic conductivity at lower temperatures than previous solid electrolytes. In some embodiments, the ionic conductivity is at least $10^{-3}$ S/cm at 80° C. In some embodiments, the atactic PPO has a crystallinity of 15% or less. In some embodiments, the electrolyte material includes at least one linear block copolymer that includes a first polymer block covalently bonded to a second polymer block different from the first polymer block. The first polymer block may be an ionically-conductive atactic poly(propylene oxide) block. The ionically-conductive atactic poly(propylene oxide) block may be combined with a salt to provide an ionically-conductive domain configured to provide pathways for ion conduction through the electrolyte material. The second polymer block may be a structural polymer block configured to provide a structural domain for the electrolyte material.

In some embodiments, the ionically conductive ceramic material may include so-called fast ion conductor ceramics such as Yttria-stabilized zirconia (YSZ), gadolinium-doped ceria (GDC), lanthanum strontium gallate magnesite (LSGM), beta alumina, and/or beta" alumina. In some embodiments, the ionically conductive ceramic material may be lithium lanthanum zirconium oxide (LLZO), lithium tin phosphorous sulfide (LSPS), antiperovskites (e.g., Li3OCl, Li3OBr), lithium phosphonate oxide (LiPON), and lithium phosphates, which are examples of ceramics materials that may be stable against Li metal. In some embodiments, there may be a second ion conducting layer such as LiPON between the anode and the separator. In these cases, the ionically conductive ceramic material may include ceramics that are unstable against Li or graphite such as lanthanum lithium titanate (LLTO), lithium aluminum titanium phosphate (LATP), and a lithium super-ionic conductor (LATSP).

In some embodiments, the ionically conductive ceramic material are pure ionically conductive ceramic materials. In some embodiments, the ionically conductive ceramic material is a mixture of an ionically conductive ceramic material and an ionically conductive glass material. It may be advantageous to use a combination of ionically conductive ceramics and glass since some ceramics alone may have pores and/or grain boundaries that cannot be completely eliminated, and the existence of the pores and/or grain boundaries may in turn result in a decrease in conductivity. In some cases, glass-ceramics have no pores and the grain boundary are improved and, as a result, a solid electrolyte having a higher conductivity is provided. It is also contemplated that, like glass, glass-ceramics can be easily formed into various shapes including a thin film.

Figure 2:
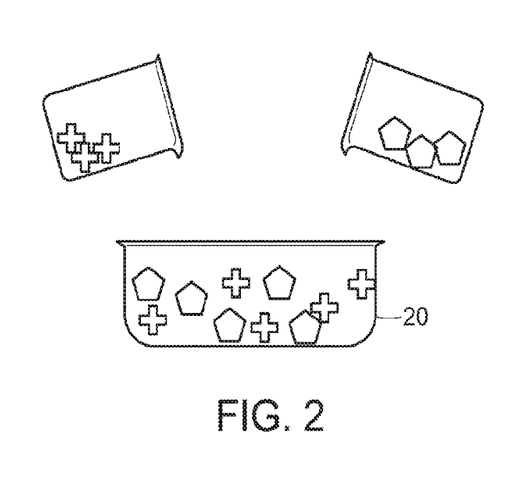
FIG. 2 is an illustration of mixing a polymer (represented by "+") and an ionically conductive ceramic material (represented by " ⌂ ") to form a mixture in which the polymer is interspersed with an ionically conductive ceramic material.
Figure 3:
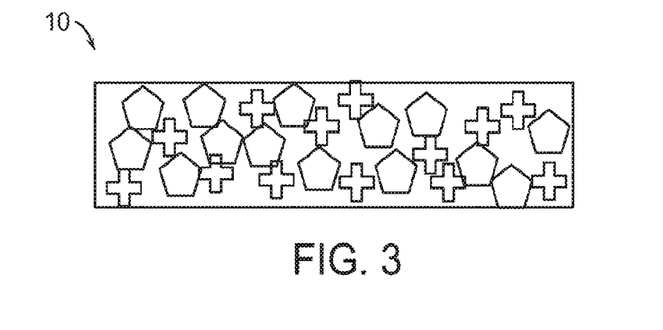
FIG. 3 is a schematic cross section of a mixed composite solid state electrolyte sheet illustrating the polymer (represented by "+") interspersed with the ionically conductive ceramic material (represented by " ⌂ ").
Figure 4:
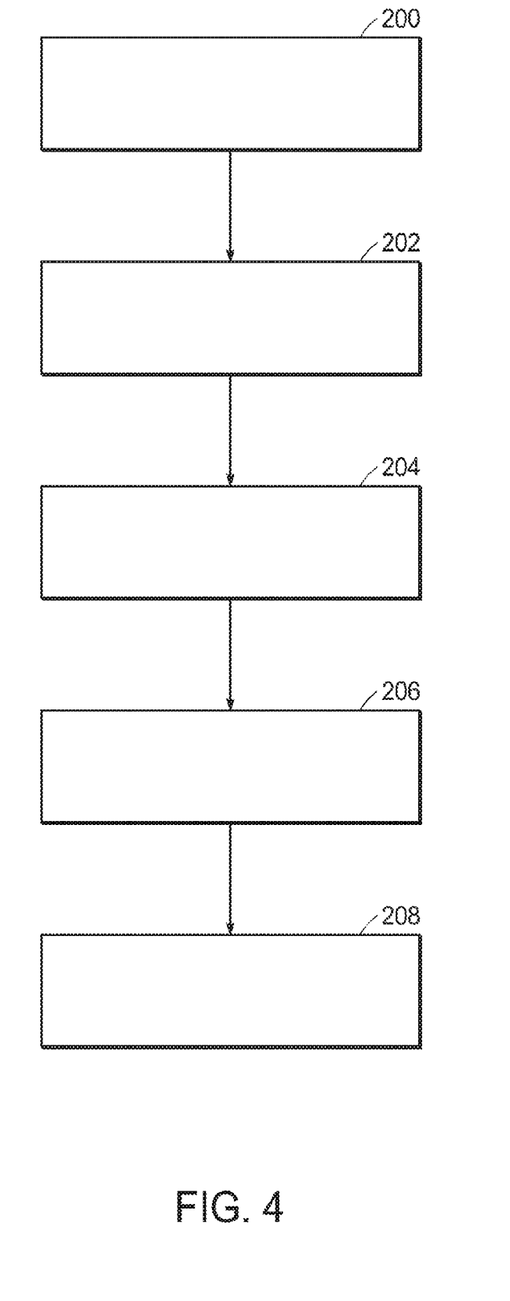
FIG. 4 is a flow chart illustrating a method of forming the mixed composite solid state electrolyte sheet.

Referring to FIGS. 2-4, a method of forming a solid state electrolyte includes the following steps. In some embodiments, the polymer and the ionically conductive ceramic material are provided in a dry form, for example as a powder or in particle form (Step 200). The dry polymer and the ionically conductive ceramic material are blended or mixed together for example in a container 20 to form a composite mixture (Step 202). As a result, the polymer and the ionically conductive ceramic material are combined such that the resulting composite material has both materials interspersed throughout. In some embodiments, it is contemplated that the ceramic materials may replace the block co-polymers currently used to give structural integrity to the polymer material.

The polymer and the ionically conductive ceramic material are further mixed with a relatively small amount of other ingredients that enhance conductivity and/or facilitate handling and manufacturability. For example, salts may be added that enhance the ionic conductivity of the overall blended material. Any kind of lithium salt conventionally used to impart lithium-ion conductivity to a desired resin material may be used. In some embodiments, the salt is a lithiated salt. An exemplary lithiated salt is Lithium bis (trifluoromethanesulfonyl)imide, often simply referred to as LiTFSI. LiTFSI is a hydrophilic salt with the chemical formula $LiC_2F_6NO_4S_2$. In some embodiments, the salt is a lithiated fluorinated salt. An exemplary lithiated fluorinated salt is lithium hexafluorophosphate ($LiPF_6$). Other possible lithium salts that can be used include, but are not limited to, $LiN(SO_2CF_3)_2$, $LiN(SO_2C_2F_5)_2$, $LiBF_4$ and $LiClO_4$ The amount of salt added is sufficient to saturate, but insufficient to form a precipitate. In some embodiments, it may be necessary to pre-treat the polymer, the ionically conductive ceramic material or both the polymer and the ionically conductive ceramic material with salt before mixing.

As another example, plasticizers may be added to produce or promote plasticity and flexibility and to reduce brittleness. Plasticizers may be in the form of a plasticizing salt, solvent or combination of both. An exemplary plasticizing salt includes $LiN(CF_3SO_2)_2$ and exemplary plasticizing solvents include diethyl phthalate, dimethyl phthalate and dimethylglycol phthalate.

Other additives may be included as required.

In some embodiments, the composite mixture includes an amount of ionically conductive ceramic material in a range of 40 percent to 90 percent, by weight, and an amount of ionically conductive polymer in a range of 60 percent to 10 percent, by weight. In addition, the composite mixture includes other material (salts, plasticizers and other additives as required) in a range of about 10 percent, by weight. In some embodiments, the amount of other material is slightly greater than 10 percent (e.g., between 10 and 15 percent) or slightly less than 10 percent (e.g., between 5 percent and 10 percent), and the amount of ionically conductive polymer and/or ionically conductive ceramic material is adjusted accordingly.

In one example in which the composite mixture is largely comprised of the ionically conductive ceramic material, the composite mixture includes about 90 percent ionically conductive ceramic material and about 10 percent ionically conductive polymer and other materials (e.g., the amount, by weight of the ionically conductive polymer and the other materials totals about 10 percent of the total weight of the mixture).

In another example in which the composite mixture is largely comprised of the ionically conductive ceramic material, the composite mixture includes about 80 percent ionically conductive ceramic material and about 20 percent ionically conductive polymer and other materials (e.g., the amount, by weight of the ionically conductive polymer and the other materials totals about 20 percent of the total weight of the mixture).

In another example, the composite mixture includes about 50 percent ionically conductive ceramic material and about 50 percent ionically conductive polymer and other materials (e.g., the amount, by weight of the ionically conductive polymer and the other materials totals about 50 percent of the total weight of the mixture).

In another example in which the composite mixture is largely comprised of the ionically conductive polymer, the composite mixture includes at least 40 percent ionically conductive ceramic material and about 60 percent ionically conductive polymer and other materials (e.g., the amount, by weight of the ionically conductive polymer and the other materials totals about 60 percent of the total weight of the mixture). It has been theorized that if the mixture includes less than about 40 percent of the ionically conductive ceramic material, the ceramic particles may be too far apart resulting in too little interfacial contact, and thus the solid state electrolyte resulting from the mixture may fail to provide increased ionic conductivity and/or structural integrity.

In some embodiments, an ionically conductive coupling agent is added to the ceramic/polymer blend to improve the surface area contact between the ceramic and the polymer. As used herein, the term "coupling agent" refers to compounds where molecules contain functional groups that bond with both organic and inorganic materials. A coupling agent acts as a sort of intermediary which bonds organic materials to inorganic materials. It is this characteristic that makes coupling agents useful for improving the mechanical strength of composite materials, for improving adhesion and for surface modification. When used in the mixture, the coupling agent will also increase the mechanical strength and flexibility of the resultant film(s). For example, the ceramic material may be pretreated with the coupling agent and then blended with the polymer. Alternatively, the coupling agent may be added to the polymer solution prior to the introduction of the ceramic.

For a given ratio of an amount of ionically conductive ceramic material, by weight, to an amount of ionically conductive polymer, by weight, the characteristics of the mixture are also determined by the size and distribution of the ceramic particles used to form the mixture and the molecular weight of the polymer used to form the mixture. Ceramic particle size and distribution and polymer molecular weight will now be discussed in detail.

The size of the ceramic particles used in the mixture is defined relative to a thickness of a film that is formed of the mixture. That is, when the mixture is used to form a solid state electrolyte separator film, the size of the ceramic particles is defined in terms of the film thickness. Moreover, the size of the ceramic particles used in the mixture is defined using a D50 value, where the term D50 refers to the median particle size of a set of particles. When the mixture is used to form a solid state electrolyte separator film, the ionically conductive ceramic material has D50 value that is less than or equal to 40 percent of the film thickness. In addition, the standard deviation of the D50 value is less than or equal to one percent of the D50 value.

In some embodiments, the ionically conductive ceramic material has a particle size distribution that is bi-modal. In the bi-modal distribution, the ionically conductive ceramic material includes a first set of particles having first median particle size defining a first mode of the particle size distribution. In addition, the ionically conductive ceramic material includes a second set of particles having second median particle size defining a second mode of the particle size distribution. Providing particles in a bi-modal distribution can be thought of as providing particles in two sizes, which improves particle packing within the mixture. The improved particle packing improves ion conduction within the resultant solid state electrolyte. In some embodiments, in the bi-modal distribution, the first median particle size is less than or equal to 40 percent of the film thickness, and the second median particle size is less than or equal to 20 percent of the film thickness. In addition, the first set of particles provides 66.6 percent by weight of a total weight of the ionically conductive ceramic material, and the second set of particles provides 33.3 percent by weight of the total weight of the ionically conductive ceramic material.

In some embodiments, the ionically conductive ceramic material has a particle size distribution that is tri-modal, which further improves ion conduction within the resultant solid state electrolyte. In the tri-modal distribution, the ionically conductive ceramic material includes three sets of particles, as follows: The ionically conductive ceramic material includes a first set of particles having first median particle size defining a first mode of the particle size distribution, a second set of particles having second median particle size defining a second mode of the particle size distribution, and a third set of particles having third median particle size defining a third mode of the particle size distribution. In some embodiments, in the tri-modal distribution, the first median particle size is less than or equal to 40 percent of the film thickness, the second median particle size is less than or equal to 20 percent of the film thickness, and the third median particle size is less than or equal to 10 percent of the film thickness. In addition, the first set of particles provides 50 percent by weight of a total weight of the ionically conductive ceramic material, the second set of particles provides 30 percent by weight of the total weight of the ionically conductive ceramic material and the third set of particles provides 20 percent by weight of the total weight of the ionically conductive ceramic material.

The molecular weight of the polymer used to form the mixture is defined in terms of molecular weight. As used herein, molecular weight is a unitless value that refers to a length of the polymer chain. In some embodiments, when the mixture is used to form a solid state electrolyte separator film, the ionically conductive polymer has a molecular weight that is less than or equal to 4,000,000. In some embodiments, when the mixture is used to form a solid state electrolyte separator film, the ionically conductive polymer has a molecular weight that in a range of 1,500,000 to 2,500,000.

In some embodiments, the binder used to secure the active cathode material 4 to the first electrically conductive sheet 5 is replaced by catholyte and the cathode 3 is a solid state cathode. Similarly, in some embodiments, the binder used to secure the active anode material 7 to the second electrically conductive sheet 8 is replaced by anolyte and the anode 6 is a solid state anode. As used herein, the terms "catholyte" and "anolyte" refer to respective compositions that are similar to that of the mixture used to form the solid state electrolyte separator film described above, except with respect to the proportions of polymer and ionically conductive ceramic material. This arrangement advantageously integrates the mixture into the cathode and/or anode active material in order to better facilitate ionic conduction. In some embodiments in which the mixture is used to replace the binder and/or form an electrode coating, the ratio of an amount of ionically conductive ceramic material, by weight, to an amount of ionically conductive polymer, by weight, remains as previously described. That is, the composite mixture includes an amount of ionically conductive ceramic material in a range of 10 percent to 90 percent, by weight, and an amount of ionically conductive polymer material in a range of 90 percent to 10 percent, by weight. In addition, the composite mixture includes other material (salts, plasticizers and other additives as required) in a range of about 10 percent, by weight. In some embodiments, the amount of other material is slightly greater than 10 percent (e.g., between 10 and 15 percent) or slightly less than 10 percent (e.g., between 5 percent and 10 percent), and the amount of ionically conductive polymer and/or ionically conductive ceramic material is adjusted accordingly.

When the mixture is combined with an electrode active material to form a solid state electrode, the size of the ceramic particles used in the mixture is defined relative to a thickness of the separator film used to separate the anode from the cathode. In some embodiments, the ionically conductive ceramic material has D50 value that is less than or equal to 20 percent of the film thickness. In addition, the standard deviation of the D50 value is less than or equal to one percent of the D50 value. In some embodiments, the ionically conductive ceramic material has a particle size distribution that is bi-modal. In some embodiments, in the bi-modal distribution, the first median particle size is less than or equal to 20 percent of the film thickness, and the second median particle size is less than or equal to 10 percent of the film thickness. In addition, the first set of particles provides 66.6 percent by weight of a total weight of the ionically conductive ceramic material, and the second set of particles provides 33.3 percent by weight of the total weight of the ionically conductive ceramic material.

When the mixture is used to form a coating for a solid state electrode, the ionically conductive polymer has a molecular weight that is less than or equal to 900,000. In some embodiments, when the mixture is used to form a coating for a solid state electrode, the ionically conductive polymer has a molecular weight that is in a range of 450,000 to 750,000.

Returning now to the method, once the composite mixture is formed, the composite mixture is then combined with a liquid to form a slurry (Step 204). The liquid may be, for example, an organic solvent. Examples of suitable organic solvents include, but are not limited to, cyclohexanone and acetonitrile. The slurry is cast as a sheet (Step 206) and dried (Step 208) to form a solid state composite electrolyte sheet. In some embodiments, the sheet will be very thin, for example less than 20 microns in thickness, and thus can be considered to be a film. In some embodiments the sheet is approximately 10 microns to 15 microns in thickness in finished form, where the term "finished" refers to a condition in which the film has been dried and calandared.

In some embodiments, as an alternative to casting, the mixture is extruded as a sheet or film. In a method in which the mixture is extruded, prior to extrusion the mixture treated in order to provide a flowable material. The step of treating the mixture may include, for example, heating the mixture, adding a sufficient amount of liquid organic solvent to the mixture to form a flowable material, or other conventional method of obtaining a flowable material. In addition, extruding the flowable material includes forming a finished sheet that is less than or equal to 20 microns thick in finished form.

In some embodiments, the resulting electrolyte sheet includes a homogeneous mixture of the polymer and the ionically conductive ceramic material. In other embodiments, the resulting electrolyte sheet is a non-laminar heterogeneous mixture of the polymer and the ionically conductive ceramic material.

To form an electrode assembly, the solid state composite electrolyte sheet 10 is stacked between alternating sheets of the cathode 3 and anode 6. In some embodiments, the stack includes a cathode 3, a first solid state composite electrolyte sheet 10, an anode 6, and a second solid state composite electrolyte sheet 10. In some embodiments, the stack includes multiple stacked sub-stacks, where each sub-stack includes a cathode 3, a first solid state composite electrolyte sheet 10, an anode 6, and a second solid state composite electrolyte sheet 10. The stack is laminated together by applying pressure along the stacking direction while applying heat. This step serves to ensure that the electrolyte sheet 10 forms a connection with the adjacent layers, and that there is good contact at the interfaces between each layer.

In some embodiments, an ionically conductive coupling agent is added to the ceramic/polymer blend to improve the surface area contact between the ceramic and the polymer. As used herein, the term "coupling agent" refers to compounds where molecules contain functional groups that bond with both organic and inorganic materials. A coupling agent acts as a sort of intermediary which bonds organic materials to inorganic materials. It is this characteristic that makes coupling agents useful for improving the mechanical strength of composite materials, for improving adhesion and for surface modification. When used in the mixture, the coupling agent will also increase the mechanical strength and flexibility of the resultant film(s). For example, the ceramic material may be pretreated with the coupling agent and then blended with the polymer. Alternatively, the coupling agent may be added to the polymer solution prior to the introduction of the ceramic.

Selective illustrative embodiments of the cell, electrolyte and method are described above in some detail. It should be understood that only structures considered necessary for clarifying these devices have been described herein, and only steps considered necessary for clarifying the method have been described herein. Other conventional structures and method steps, and those of ancillary and auxiliary components of the cell and electrolyte, are assumed to be known and understood by those skilled in the art. Moreover, while working examples of the cell, electrolyte and method have been described above, the cell, electrolyte and method are not limited to the working examples described above, but various design alterations may be carried out without departing from the devices and methods as set forth in the claims.

We claim:

1. A solid state electrolyte, comprising a mixture of an ionically conductive polymer that is interspersed with an ionically conductive ceramic material, wherein the mixture is configured such that a ratio of the weight of the ionically conductive ceramic material to the weight of the ionically conductive polymer is in a range of 90/10 to 40/60,
    wherein
        the ionically conductive ceramic material has a particle size distribution that is tri-modal,
        the ionically conductive ceramic material includes a first set of particles having first median particle size defining a first mode of the particle size distribution, the first median particle size being less than or equal to 40 percent of the film thickness,
        the ionically conductive ceramic material includes a second set of particles having second median particle size defining a second mode of the particle size distribution, the second median particle size being less than or equal to 20 percent of the film thickness, and
        the ionically conductive ceramic material includes a third set of particles having third median particle size defining a third mode of the particle size distribution, the third median particle size being less than or equal to 10 percent of the film thickness,
    wherein the first set of particles provides 50 percent by weight of a total weight of the ionically conductive ceramic material, the second set of particles provides 30 percent by weight of the total weight of the ionically conductive ceramic material and the third set of particles provides 20 percent by weight of the total weight of the ionically conductive ceramic material.

2. The solid state electrolyte of claim 1, wherein
the solid state electrolyte is a separator film having a film thickness, and
the ionically conductive ceramic material has a median particle size that is less than or equal to 40 percent of the film thickness.

3. The solid state electrolyte of claim 2, wherein the standard deviation of the median particle size is less than or equal to one percent of the median particle size.

4. The solid state electrolyte of claim 1, wherein the ionically conductive polymer is an atactic polypropylene oxide.

5. The solid state electrolyte of claim 1, wherein the mixture includes an ionically conductive coupling agent that is configured to improve the surface area contact between the ionically conductive ceramic material and the ionically conductive polymer.

6. The solid state electrolyte of claim 1, wherein the ionically conductive polymer has a molecular weight that is less than or equal to 4,000,000.

7. The solid state electrolyte of claim 1, wherein the ionically conductive polymer has a molecular weight that is in a range of 1,500,000 to 2,500,000.

8. The solid state electrolyte of claim 1, wherein the ionically conductive ceramic material is mixed with the ionically conductive polymer in such a way that both materials are interspersed throughout the mixture.

9. A solid state electrolyte that is configured to be combined with an active material to form an electrode of an electrochemical cell that includes a solid state electrolyte separator, the separator having a separator thickness, the solid state electrolyte comprising a mixture of an ionically conductive polymer that is interspersed with an ionically conductive ceramic material, wherein the mixture is configured such that a ratio of the weight of the ionically conductive ceramic material to the weight of the ionically conductive polymer is in a range of 90/10 to 40/60,
    wherein
        the ionically conductive ceramic material has a particle size distribution that is tri-modal,
        the ionically conductive ceramic material includes a first set of particles having first median particle size defining a first mode of the particle size distribution, the first median particle size being less than or equal to 40 percent of the film thickness,
        the ionically conductive ceramic material includes a second set of particles having second median particle size defining a second mode of the particle size distribution, the second median particle size being less than or equal to 20 percent of the film thickness, and
        the ionically conductive ceramic material includes a third set of particles having third median particle size defining a third mode of the particle size distribution, the third median particle size being less than or equal to 10 percent of the film thickness,
    wherein the first set of particles provides 50 percent by weight of a total weight of the ionically conductive ceramic material, the second set of particles provides 30 percent by weight of the total weight of the ionically conductive ceramic material and the third set of particles provides 20 percent by weight of the total weight of the ionically conductive ceramic material.

10. The solid state electrolyte of claim 9, wherein
the ionically conductive ceramic material has a median particle size that is less than or equal to 20 percent of the separator thickness.

11. The solid state electrolyte of claim 10, wherein the standard deviation of the median particle size is less than or equal to one percent of the median particle size.

12. The solid state electrolyte of claim 10, wherein the ionically conductive polymer has a molecular weight that is less than or equal to 900,000.

13. The solid state electrolyte of claim 10, wherein the ionically conductive polymer has a molecular weight that is in a range of 450,000 to 750,000.

14. The solid state electrolyte of claim 10, wherein the mixture includes an ionically conductive coupling agent that is configured to improve the surface area contact between the ionically conductive ceramic material and the ionically conductive polymer.

15. An electrochemical cell comprising:
a positive electrode,
a negative electrode, and a solid state electrolyte that is disposed between the positive electrode and the negative electrode and electrically insulates the positive electrode from the negative electrode while allowing ions to move between the positive electrode and the negative electrode, the solid state electrolyte comprising a first mixture of a first ionically conductive polymer that is interspersed with a first ionically conductive ceramic material, wherein the first mixture is configured such that a ratio of the weight of the first ionically conductive ceramic material to the weight of the first ionically conductive polymer in a range of 65/35 to 40/60, wherein
- the ionically conductive ceramic material has a particle size distribution that is tri-modal,
- the ionically conductive ceramic material includes a first set of particles having first median particle size defining a first mode of the particle size distribution, the first median particle size being less than or equal to 40 percent of the film thickness,
- the ionically conductive ceramic material includes a second set of particles having second median particle size defining a second mode of the particle size distribution, the second median particle size being less than or equal to 20 percent of the film thickness, and
- the ionically conductive ceramic material includes a third set of particles having third median particle size defining a third mode of the particle size distribution, the third median particle size being less than or equal to 10 percent of the film thickness, wherein the first set of particles provides 50 percent by weight of a total weight of the ionically conductive ceramic material, the second set of particles provides 30 percent by weight of the total weight of the ionically conductive ceramic material and the third set of particles provides 20 percent by weight of the total weight of the ionically conductive ceramic material.

16. A solid state electrolyte, comprising a mixture of an ionically conductive polymer that is interspersed with an ionically conductive ceramic material, wherein the mixture is configured such that a ratio of the weight of the ionically conductive ceramic material to the weight of the ionically conductive polymer is in a range of 65/35 to 40/60, wherein
- the ionically conductive ceramic material has a particle size distribution that is tri-modal,
- the ionically conductive ceramic material includes a first set of particles having first median particle size defining a first mode of the particle size distribution, the first median particle size being less than or equal to 40 percent of the film thickness,
- the ionically conductive ceramic material includes a second set of particles having second median particle size defining a second mode of the particle size distribution, the second median particle size being less than or equal to 20 percent of the film thickness, and
- the ionically conductive ceramic material includes a third set of particles having third median particle size defining a third mode of the particle size distribution, the third median particle size being less than or equal to 10 percent of the film thickness, wherein the first set of particles provides 50 percent by weight of a total weight of the ionically conductive ceramic material, the second set of particles provides 30 percent by weight of the total weight of the ionically conductive ceramic material and the third set of particles provides 20 percent by weight of the total weight of the ionically conductive ceramic material.

17. A solid state electrolyte that is configured to be combined with an active material to form an electrode of an electrochemical cell that includes a solid state electrolyte separator, the separator having a separator thickness, the solid state electrolyte comprising a mixture of an ionically conductive polymer that is interspersed with an ionically conductive ceramic material, wherein the mixture is configured such that a ratio of the weight of the ionically conductive ceramic material to the weight of the ionically conductive polymer is in a range of 65/35 to 40/60, wherein
- the ionically conductive ceramic material has a particle size distribution that is tri-modal,
- the ionically conductive ceramic material includes a first set of particles having first median particle size defining a first mode of the particle size distribution, the first median particle size being less than or equal to 40 percent of the film thickness,
- the ionically conductive ceramic material includes a second set of particles having second median particle size defining a second mode of the particle size distribution, the second median particle size being less than or equal to 20 percent of the film thickness, and
- the ionically conductive ceramic material includes a third set of particles having third median particle size defining a third mode of the particle size distribution, the third median particle size being less than or equal to 10 percent of the film thickness, wherein the first set of particles provides 50 percent by weight of a total weight of the ionically conductive ceramic material, the second set of particles provides 30 percent by weight of the total weight of the ionically conductive ceramic material and the third set of particles provides 20 percent by weight of the total weight of the ionically conductive ceramic material.

18. An electrochemical cell comprising:
a positive electrode,
a negative electrode, and
a solid state electrolyte that is disposed between the positive electrode and the negative electrode and electrically insulates the positive electrode from the negative electrode while allowing ions to move between the positive electrode and the negative electrode, the solid state electrolyte comprising a first mixture of a first ionically conductive polymer that is interspersed with a first ionically conductive ceramic material, wherein the first mixture is configured such that a ratio of the weight of the first ionically conductive ceramic material to the weight of the first ionically conductive polymer in a range of 90/10 to 40/60, wherein
- the ionically conductive ceramic material has a particle size distribution that is tri-modal,
- the ionically conductive ceramic material includes a first set of particles having first median particle size defining a first mode of the particle size distribution, the first median particle size being less than or equal to 40 percent of the film thickness,
- the ionically conductive ceramic material includes a second set of particles having second median particle size defining a second mode of the particle size distribution, the second median particle size being less than or equal to 20 percent of the film thickness, and the ionically conductive ceramic material includes a third set of particles having third median particle size defining a third mode of the particle size distribution, the third median particle size being less than or equal to 10 percent of the film thickness, wherein the first set of particles provides 50 percent by weight of a total weight of the ionically conductive ceramic material, the second set of particles provides 30 percent by weight of the total weight of the ionically conductive ceramic material and the third set of particles provides 20 percent by weight of the total weight of the ionically conductive ceramic material.

* * * * *